Patented Mar. 4, 1952

2,587,616

UNITED STATES PATENT OFFICE 2,587,616

ALKYLMERCAPTOALKYL PHOSPHITES

Denham Harman, Berkeley, Calif., assignor to Shell Development Company, San Francisco, Calif., a corporation of Delaware No Drawing. Application July 13, 1948,
Serial No. 38,561

7 Claims. (Cl. 260—461)

This invention relates to aliphatic phosphites containing sulfur atoms solely combined in the form of monothioether groups and to a process for their production. In its most specific embodiment the invention provides a novel class of compounds, the alkylmercaptoalkyl phosphites, and a method of preparing them by a unitary process which avoids the necessary separation of complex mixtures of closely related compounds.

Numerous organic compounds containing both sulfur and phosphorus atoms are known and have proven to be valuable for uses such as stabilizers, extreme pressure additives for mineral oils, detergents, and the like. The aliphatic alcohol esters of phosphorous acid, the alphatic phosphites, have proven to be of particular value. Heretofore aliphatic phosphites containing sulfur atoms have been prepared by reactions such as: the reaction between aliphatic thiols and phosphorus halides, producing thiophosphites; the reaction between phosphorous acid and alkylene-sulfides, producing phosphites containing terminal thiol groups; and the reaction of phosphorus halides with sulfurized alcohols, including polyhydric alcohols such as glycerol and unsaturated alcohols, and unsaturated alcohols such as the alcohols derived from sperm oil, producing complex mixtures of phosphites containing sulfur atoms combined in the form of a variety of groups and containing hydroxyl groups. The phosphites containing thiol groups inherently have the bad odor and the characteristics of the mercaptans, the thiophosphites have the property of readily hydrolyzing into compounds containing thiol groups and are thus compounds which have an objectionable odor and which are relatively unstable. The phosphites containing hydroxyl groups have tendencies toward water solubility and hydrocarbon insolubility, and as they are produced in the form of difficultly separable mixtures, have the disadvantage of varying in properties from batch to batch.

A principal object of the present invention is to provide a series of individual aliphatic phosphites containing sulfur atoms solely combined in the form of monothioether groups, particularly bis and tris(alkylmercaptoalkyl) phosphites exhibiting unobvious and valuable properties in addition to the properties generally exhibited by compounds containing both sulfur and phosphorus atoms. A further object of the invention is to provide a method of producing certian alkylmercaptoalkyl phosphites by a unitary reaction process which is suitable for the commercial scale production of individual compounds and which avoids the necessity of separating complex mixtures of closely related compounds. Still other objects and advantages will be apparent from the following description of the invention.

The compounds provided by the invention are a particular class of aliphatic phosphites, i. e., the aliphatic alcohol esters of phosphorous acid. Phosphorous acid exhibits properties of both a di and tribasic acid and is considered to exist in the forms, $O:PH(OH)_2 \rightleftharpoons P(OH)_3$. Its esters are compounds in which organic radicals replace from one to three hydrogen atoms of the hydroxyl groups of phosphorous acid.

The class of aliphatic phosphites provided by the invention are characterized by the presence of sulfur atoms solely in the form of monothioether groups in the aliphatic radicals replacing hydrogen atoms of the hydroxyl groups of phosphorous acid. The preferred class of compounds, the alkylmercaptoalkyl phosphites, are aliphatic phosphites in which the aliphatic radicals replacing the hydrogen atoms of the hydroxyl groups of phosporous acid are of the general formula, $-R_1-S-R$, in which R and $R_1$, respectively, represent mono and divalent hydrocarbon radicals formed by the removal of hydrogen atoms from saturated aliphatic hydrocarbons.

Illustrative examples of the compounds provided by the invention include straight chain phosphites such as the 3-amylmercaptopropyl phosphites, the 4-decylmercaptobutyl phosphites, and the 5-pentadecylmercaptopentyl phosphites; branched chain phosphites such as the 3-amyl-mercapto-2-methylpropyl phosphites, the 3-octyl-mercapto-2-propylbutyl phosphites, and the 1,1,3-trimethylbutylmercapto - 3 - methylpropyl phosphites; and phosphites containing cyclic groups in the chain such as the 3-cyclohexylmercaptopropyl phosphites, the 2-amylmercapto - 1 - cyclohexyl-ethyl phosphites, and the 3-cyclopentylmercapto-2-methylpropyl phosphites.

We have also found that in numerous structural variations (such as mixed esters and esters in which the alkylmercaptoalkyl radicals contain polar substituents) aliphatic compounds containing phosphorus as well as sulfur atoms retain the advantageous stability and freedom from strong objectionable odors when the sulfur atoms are solely combined in the form of monothioether groups.

For example, we have found that heating ethylene chlorohydrin with phosphorus halides produces bis- and tris-haloalkyl phosphites, and further that when such phosphites are reacted with sodium sulfide, mixed alkylmercaptoalkyl phosphites in which the alkylmercaptoalkyl radicals contain polar substituents are formed. An example of such a poly-functional phosphite is ClCH₂CH₂OPH(O)OCH₂CH₂SCH₂CH₂OPH(O)OCH₂CH₂Cl which is a stable and valuable compound.

Similarly, by reacting an unsaturated alcohol such as allyl alcohol with phosphorus trihalides, di and trialkenyl phosphites are produced and by reacting the phosphites so produced with hydrogen sulfide or mercaptans, polyfunctional substituted alkylmercaptoalkyl phosphites such as

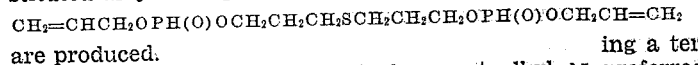

are produced.

A preferred class of the alkylmercaptoalkyl phosphites which are produced in particularly good yields by the reaction process provided by the present invention are the 3-alkylmercaptoalkyl phosphites as typified by bis and tris(3-amylmercaptopropyl) phosphite.

The alkylmercaptoalkyl phosphites in addition to their valuable properties as corrosion inhibitors, extreme pressure additives for mineral oils, detergents, and the like, have unobvious and valuable additional properties. As typified by the bis or tris(3-amylmercaptopropyl) phosphites the alkylmercaptoalkyl phosphites have been found to have a remarkable ability to lower the softening point, decrease the stiffness, and, in general, to plasticize vinyl resins such as polyvinyl chloride. The alkylmercaptoalkyl phosphites unexpectedly provide a greater change in the properties of the resin per unit of additive and provide a lower brittle point in the plastic compositions than do many compounds commonly employed as plasticizers for the resins.

Although the C—S—C grouping (the monothioether grouping) is known to be extremely reactive and adds to a great variety of substances to form sulfonium compounds or clearly defined molecular compounds, it has now been discovered that one class of compounds, the alkylmercaptoalkanols react with phosphorus halides in the presence of a base to form phosphites in the substantial absence of the formation of compounds involving the C—S—C grouping.

The novel process provided by the invention for the production of the alkylmercaptoalkyl phosphites comprises maintaining substantially equimolar portions of an alkanethiol and an alkenol in the presence of a minor amount of an organic peroxide at the decomposition temperature of the peroxide until a substantially complete reaction has occurred; and then adding to the mixture, at a temperature of not more than about 50° C., a phosphorus halide and an organic base.

Suitable mercaptans, the alkanethiols, for employment in the unitary process include straight, cyclic or branched chain aliphatic primary, secondary or tertiary alkanethiols. The alkanethiols containing up to about twenty carbon atoms are sufficiently reactive and are suitable reactants for the process, but those containing from about four to about twelve carbon atoms are preferred. Illustrative examples of suitable mercaptans include: primary mercaptans such as 2-methyl-1-propanethiol, 1-pentanethiol (amylmercaptan), 3 - methylcyclohexylmethanethiol, 5,5-dimethylhexane-1-thiol, and 1-eicosanethiol; secondary mercaptans such as 2-hexanethiol, 1-cyclohexylpropane - 1 - thiol, and 1,3-dimethylbutane-1-thiol and cyclopentanethiol, as well as tertiary mercaptans such as 1,1,3-trimethylbutane-1-thiol, trimethylmethanethiol and diethylcyclohexylmethanethiol.

Suitable alcohols for employment in the unitary process include straight, cyclic or branched chain mononolefinic aliphatic primary, secondary or tertiary alcohols, and a preferred class of alcohols are aliphatic alcohols in which the hydroxyl group and the double bond are in the allylic arrangement, i. e., the double bond occurs between two carbon atoms one of which is linked by a single bond to the carbon atom bearing the hydroxyl group. The 2-alkenols of the allylic structure containing not more than about five carbon atoms and containing a terminal methylene group are particularly preferred. Illustrative examples of suitable alcohols include primary alcohols such as allyl alcohol, methallyl alcohol, 1-hydroxymethyl-1-cyclohexene, 2-hepten-1-ol, 2-buten-1-ol, and 2-decen-1-ol; secondary alcohols such as 1-buten-3-ol, 1-octen-3-ol; and tertiary alcohols such as 3-ol, isobutenol, 2,3-dimethyl-1-buten-3-ol and 2-methyl-3-penten-2-ol.

The process provided by the present invention is unitary in that the reactants are combined in a stepwise manner in a single reactor without the necessary separation of intermediates from side reaction products produced conjointly with the intermediates. It is therefore necessary that a substantially complete reaction between the mercaptan and alkenol occur prior to the addition of the phosphorus halide to avoid the formation of thiophosphites. Although numerous procedures may be employed to accomplish a reaction between various mercaptans and alkenols, see for example, copending application Serial No. 701,412, filed October 5, 1946, now U. S. Patent 2,522,512, and copending application Serial No. 708,194, filed November 6, 1946, now abandoned, it has been discovered that the employment of a peroxide reaction initiator and an alkenol of the allylic structure are particularly advantageous in the unitary process. It is similarly advantageous to follow the course of the reaction between the mercaptan and the alkenol, for example, by the rise of the refractive index, and to allow it to become substantially complete before adding the phosphorus halide.

Of the organic peroxides, those containing at least one tertiary carbon atom linked to the peroxy group are especially suitable for employment in the present process. Illustrative examples of suitable peroxide reactants include the dihydrocarbyl peroxides and their analogs in which one hydrocarbyl radical contains polar substituents such as: di-tertiary-butyl peroxide, chloro-di-tertiary-butyl peroxide, diethyl peroxide, diamyl peroxide, dicyclohexyl peroxide, allyl tertiary-butyl peroxide, cumyl tertiary-butyl peroxide and isopropyl tertiary-butyl peroxide; dihydrocarbylperoxyalkanes and their analogs in which the alkane residue or one hydrocarbylperoxy radical contains polar substituents such as: 2,2-bis(tertiary-butylperoxy)butane, 2 - methylperoxy-2-tertiary-butylperoxypropane, 3-chloro-2,2-bis(tertiary-butylperoxy)pentane, phenyl - bis(tertiary - butylperoxy)methane and 2,2-bis(tertiary-butylperoxy)-3-chloro-propane; and hydrocarbyl peresters such as: tertiary-butyl perbenzoate, tertiary-butyl perlaurate, di-tertiary-butyl dipermalonate, and ethyl perbenzoate. The decomposition temperature (the recommended temperature ranges for their use) of organic peroxides are determinable properties and are in many cases known to the art. For example, U. S. Patent No. 2,379,218 describes numerous suitable organic peroxides and the recommended temperature ranges for their use, including:

|  | Degrees C. |
|---|---|
| Diethylpercarbonate | 45 to 70 |
| Allyl percarbonate | 50 to 80 |
| Benzoyl peroxide | 70 to 80 |
| Acetyl peroxide | 70 to 90 |
| Beta-chlorobenzoyl peroxide | 85 to 95 |
| Methyl n-amyl ketone peroxide | 110 to 135 |
| Methyl isobutyl ketone peroxide | 110 to 135 |
| Ethyl peroxide | 125 to 145 |
| Methyl isobutyl peroxide | 130 to 150 |
| Dicyclohexyl peroxide | 150 |

A particularly preferred class of organic peroxides containing at least one tertiary carbon atom attached to the peroxy group are those in which only hydrocarbon radicals or hydrocarbon acyl radicals are attached to the peroxy group. The decomposition temperature of typical peroxides of the particular preferred class include:

|  | Degrees C. |
|---|---|
| Di-tertiary-butyl diperoxalate | 0 to 40 |
| Di-tertiary-butyl dipermalonate | 20 to 60 |
| Tertiary-butyl perbenzoate | 75 to 115 |
| 2,2-bis(tertiary-butylperoxy)-butane | 80 to 120 |
| Di-tertiary-butyl peroxide | 115 to 150 |

It is preferable to add the phosphorus halide, phosphorus trichloride being the preferred phosphorus halide, as a solution in an inert solvent. The normally liquid hydrocarbons and ethers comprise the preferred class of inert solvents. Illustrative examples of such hydrocarbons and ethers include pentane, nonane, cyclohexane, benzene, toluene and the like hydrocarbons, and diethyl, dibutyl, diisopropyl and the like ethers.

Any hydrocarbon-soluble organic amine may be employed in conjunction with the phosphorus halide. Where the preparation of a bis(alkylmercaptoalkyl) phosphite is desired it is preferable to employ the amine in substantially a 2 to 1 molar ratio with the phosphorus halide. Similarly, to produce the tris compounds the use of a 3 to 1 molar ratio is preferred. Illustrative examples of suitable bases include pyridine, toluidine, N-methyl-aniline, butylamine, tripentylamine and the like amines.

The amount of phosphorus halide to be employed may be varied over wide limits, but is preferable to employ an amount which is less than the amount of the alcohol. The amount of phosphorus halide to a certain extent determines whether the bis or tris phosphite is to predominate, but the amount of base and the reaction temperature exert greater influence.

Temperatures of from 0° C. to 50° C. are suitable for the reaction with the phosphorus halide. The lower temperatures tend to favor the formation of the tris phosphites and the range of from about 10° C. to 20° C. is preferred for their production.

The following examples illustrate the preparation of the novel compounds by the preferred unitary process and by the employment of the alkylmercapto-substituted monohydric alcohols as starting materials. As many variations in the reactants and reaction conditions are within its scope, the invention is not limited to the particular materials and conditions described in the examples.

*Example I.—The production of alkylmercaptoalkyl phosphites by the unitary process*

A mixture of 86 grams (1.0 mole) of 2-methyl-1-buten-3-ol, 90 grams (1.0 mol) of isobutyl mercaptan (2-methylpropane-1-thiol) and 1.8 grams (1% by weight of the total reactants) of di-tertiary-butyl peroxide is heated in the absence of oxygen at 120° C. for about 5 hours. The reaction mixture is cooled to 5° C., and 500 cc. of ether and 79.1 grams (1.0 mol) of pyridine are added. While the reaction mixture is maintained at between 5 and 10° C., 46 grams (0.33 mole) of phosphorus trichloride is slowly added with constant agitation. The precipitated salt is filtered off and the volatile components of the reaction mixture are removed by vacuum distillation. The residue consists of tris[3-(2-methylpropylmercapto)-2,3-dimethylbutyl] phosphite.

*Example II.—The production of a bis(alkylmercaptoalkyl) phosphite*

A solution of 324.4 grams (2.0 moles) of 3-amylmercapto-1-propanol and 106 grams (1.34 moles) of pyridine in 500 cc. of ether was agitated at from 5 to 10° C. while 91.7 grams (0.677 mole) of phosphorus trichloride was slowly introduced. The precipitated amine salt was filtered off and the reaction mixture was distilled under a pressure of 1 mm. until the kettle temperature reached 275° C. The residue, amounting to a 93.5% yield, was a light amber colored oil which was identified by the following analysis to be bis(3-amylmercaptopropyl) phosphite:

|  | Found | Calculated for $C_{16}H_{35}O_3PS_2$ |
|---|---|---|
| Percent P | 7.5  7.6 | 8.36 |
| Percent S | 17.1  17.0 | 17.3 |
| Molecular Weight | 394 (cryoscopic, in benzene). | 370 |

*Example III.—The production of a tris(alkylmercaptoalkyl) phosphite*

A solution of 162 grams (1.0 mole) of 3-amylmercapto-1-propanol and 79.1 grams (1.0 mole) of pyridine in 500 cc. of ether was agitated at from 5 to 10° C. while 46 grams (0.33 mole) of phosphorus trichloride was slowly introduced. The precipitated amine salt was filtered off and the reaction mixture was distilled under a pressure of 1 mm. of mercury until the kettle temperature reached 200° C. The residue (amounting to a 85% yield) was identified by the following analysis to be tris(amylmercaptopropyl) phosphite:

|  | Found | Calculated for $C_{24}H_{52}O_3PS_3$ |
|---|---|---|
| Percent S | 18.3  18.0 | 18.6 |
| Percent P | 6.09  6.06 | 6.04 |
| Molecular Weight | 483±25 (cryoscopic, in dioxane). | 515 |
| Pour Point | <−60° C. |  |

*Example IV.—The production of cycloalkylmercaptoalkyl phosphites*

Tris(3-cyclohexylmercaptopropyl) phosphite is produced by heating a mixture of 1 mole of allyl alcohol, 1 mole of cyclohexyl mercaptan, and 1% based on the total weight of the reactants of di-tertiary-amyl peroxide in the absence of oxygen at 120° C. until the rise in the refractive index of the mixture indicates the substantially complete conversion of the reactants. The reaction mixture is then cooled to about 5° C., 1 mole of pyridine and 500 cc. of pentane are added, and while the temperature is maintained below about 10° C., 0.33 mole of phosphorus trichloride is introduced. The phosphite is separated by filtering off the precipitated amine salt and fractionally distilling the filtrate.

The surprising and valuable properties exhibited by the alkylmercaptoalkyl phosphites when incorporated into a vinyl resin are indicated by the following:

Samples of polyvinyl chloride varying only in the plasticizer used were prepared for comparison.

| Plasticizing Material | Amount of Plasticizer [1] | Brittle Point | Stiffness in Flexure [2] |
|---|---|---|---|
| | | ° C. | |
| dioctyl phthalate | 40 | −18 | 2,400 |
| | 60 | −35 | 900 |
| bis(3-amylmercaptopropyl) phosphite | 40 | −60 | 278 |
| | 60 | below −65 | 1,200 |
| tris(3-amylmercaptopropyl) phosphite | 60 | −50 | 790 |

[1] In parts by weight per hundred parts of resin.
[2] In pounds per square inch.

It will be seen that the alkylmercaptoalkyl phosphites have the surprising property of providing per part of plasticizer a greater lowering of the brittle point and stiffness than one of the most commonly employed plasticizers.

The invention claimed is:

1. Bis(3-amylmercaptopropyl) phosphite.
2. Tris(3-amylmercaptopropyl) phosphite.
3. A 3-alkylmercaptoalkyl ester of phosphorus acid in which at least two hydrogen atoms of the acid are replaced by 3-alkylmercaptoalkyl radicals.
4. An alkylmercaptoalkyl ester of phosphorous acid in which at least two hydrogen atoms of the acid are replaced by alkylmercaptoalkyl radicals.
5. An organic ester of phosphorous acid in which the organic radicals which replace hydrogen atoms from the hydroxyl groups of the acid have the formula R—S—R$_1$— in which R and R$_1$ are, respectively, monovalent and divalent saturated aliphatic hydrocarbon radicals, R containing from 1 to 15 and R$_1$ containing from 2 to 5 carbon atoms.
6. A tris(3-alkylmercaptoalkyl) phosphite.
7. A bis(3-alkylmercaptoalkyl) phosphite.

DENHAM HARMAN.

REFERENCES CITED

The following references are of record in the file of this patent:

UNITED STATES PATENTS

| Number | Name | Date |
|---|---|---|
| 2,205,021 | Schuette et al. | June 18, 1940 |
| 2,241,244 | Conary et al. | May 6, 1941 |
| 2,371,631 | Lincoln et al. | Mar. 20, 1945 |
| 2,372,244 | Adams et al. | Mar. 27, 1945 |
| 2,373,879 | Dietrich | Apr. 17, 1945 |
| 2,432,095 | Frey | Dec. 9, 1947 |